(12) United States Patent
Roesner

(10) Patent No.: US 7,583,497 B2
(45) Date of Patent: Sep. 1, 2009

(54) DRIVE LOADING SYSTEM

(75) Inventor: Arlen L. Roesner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1310 days.

(21) Appl. No.: 10/647,915

(22) Filed: Aug. 26, 2003

(65) Prior Publication Data
US 2005/0047075 A1 Mar. 3, 2005

(51) Int. Cl.
G06F 1/16 (2006.01)
(52) U.S. Cl. ............................. 361/679.33; 361/679.37
(58) Field of Classification Search .................. 361/683, 361/685, 687, 690; 312/332.1, 333; 369/75.1, 369/75.2, 76, 77.1, 78–82
See application file for complete search history.

(56) References Cited
U.S. PATENT DOCUMENTS

| | | | |
|---|---|---|---|
| 2,609,268 A * | 9/1952 | Nye | ........................ 312/332.1 |
| 5,222,897 A | 6/1993 | Collins et al. | |
| 5,325,263 A * | 6/1994 | Singer et al. | ................. 361/683 |
| 5,481,431 A * | 1/1996 | Siahpolo et al. | ............. 361/685 |
| 5,751,551 A | 5/1998 | Hileman et al. | |
| 5,978,212 A | 11/1999 | Boulay et al. | |
| 6,008,984 A * | 12/1999 | Cunningham et al. | ....... 361/685 |
| 6,067,225 A | 5/2000 | Reznikov et al. | |
| 6,356,441 B1 | 3/2002 | Claprood | |
| 6,421,236 B1 | 7/2002 | Montoya et al. | |
| 6,532,150 B2 | 3/2003 | Sivertsen et al. | |

* cited by examiner

Primary Examiner—Jayprakash N Gandhi
Assistant Examiner—Anthony Q Edwards

(57) ABSTRACT

A drive loading system comprises a chassis adapted to receive at least one drive. The drive loading system also comprises a carrier adapted to support insertion of the drive into the chassis in a first direction. The carrier is further adapted to move the drive in a second direction different than the first direction to engage the drive with a socket.

14 Claims, 5 Drawing Sheets

DRIVE LOADING SYSTEM

TECHNICAL FIELD OF THE INVENTION

The present invention relates generally to the field of computer systems and, more particularly, to a drive loading system.

BACKGROUND OF THE INVENTION

Computer systems, such as desktop and server systems, often accommodate a variety of types of drives, such as hard drives, compact disc drives, and others. To facilitate installation and/or interchangeability of the drives, computer systems generally include a chassis having an opening to accommodate insertion of the drive into the chassis. A backplane having a socket or other type of connector for communicatively engaging the particular drive is generally located at the rear of the opening so that the drive may be brought directly into engagement with the socket by inserting the drive into the opening. A cooling fan is often located behind the backplane to draw an airflow adjacent the drive to dissipate thermal energy generated by the drive.

However, the above-described computer system may not be capable of providing sufficient cooling of the drive. For example, the backplane often contains a variety of components and may lack sufficient openings or cut-outs to enable a sufficient volume of air to flow adjacent the drive. Thus, the airflow must often be diverted around the backplane to provide cooling to the drive. Additionally, because of the requirement to divert the airflow around the backplane, additional fans or more powerful fans may be required.

SUMMARY OF THE INVENTION

In accordance with one embodiment of the present invention, a drive loading system comprises a chassis adapted to receive at least one drive and a carrier adapted to support insertion of the drive into the chassis in a first direction. The carrier is further adapted to move the drive in a second direction different than the first direction to engage the drive with a socket.

In accordance with another embodiment of the present invention, a drive carrier comprises at least one support member adapted to support insertion of a drive into a chassis in a first direction. The drive carrier also comprises an actuator coupled to the at least one support member. The actuator is adapted to move the drive in a second direction different than the first direction to engage a socket within the chassis.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-5 of the drawings, like numerals being used for like and corresponding parts of the various drawings.

Figure 1:
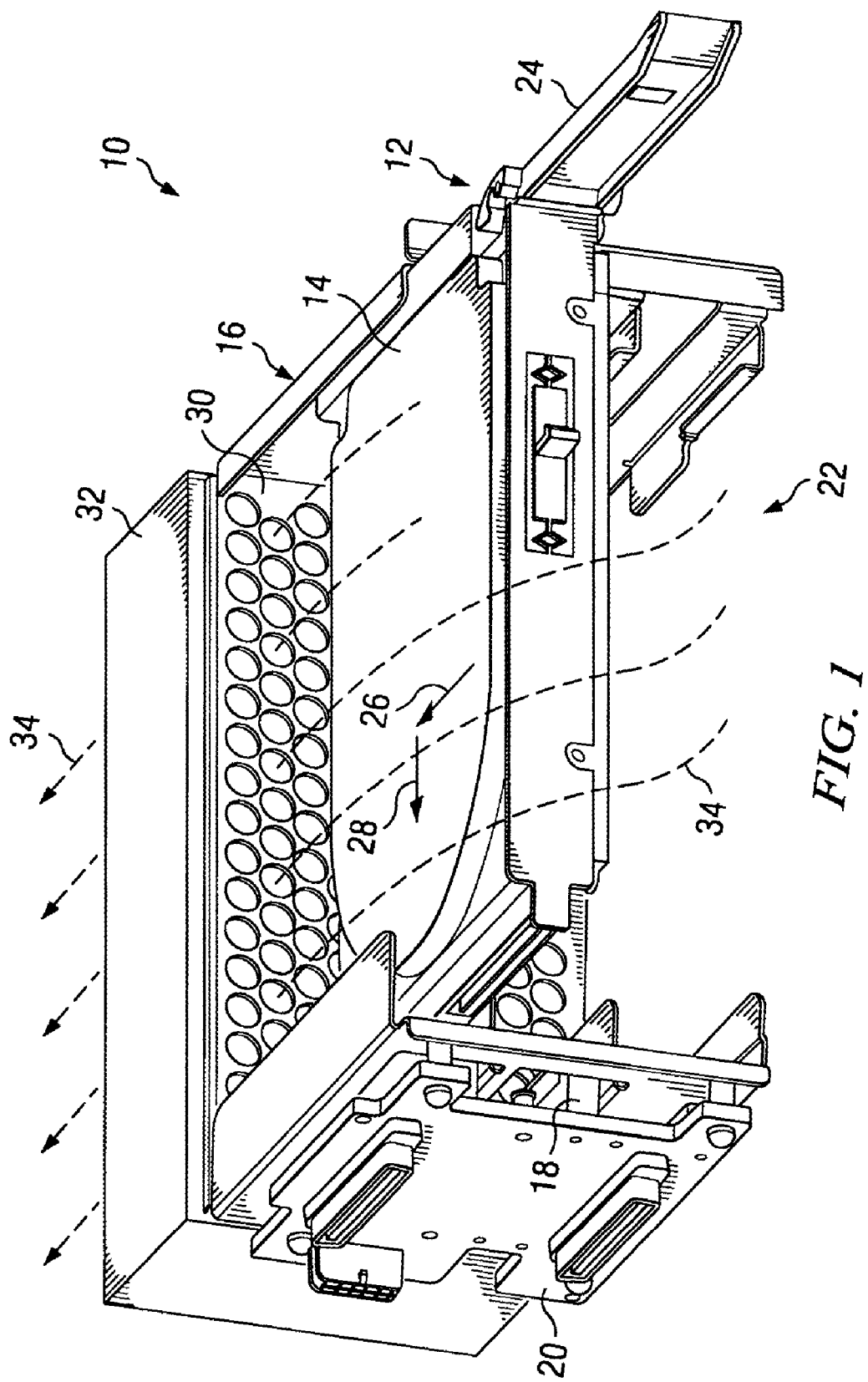
FIG. 1 is a diagram illustrating an embodiment of a drive loading system in accordance with the present invention.
Figure 2:
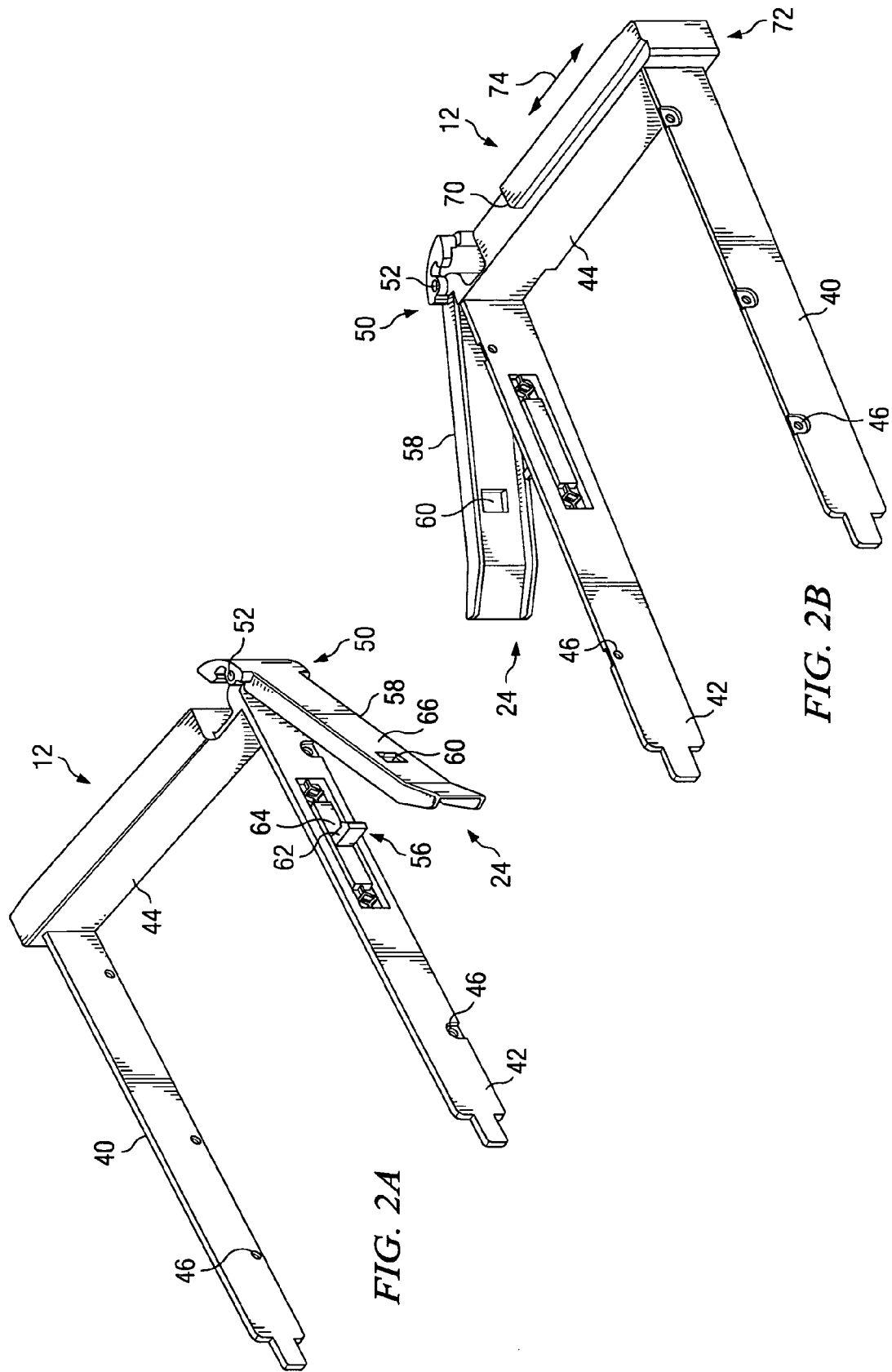
FIGS. 2A and 2B are diagrams illustrating an embodiment of a drive carrier illustrated in FIG. 1.

FIG. 1 is a diagram illustrating an embodiment of a drive loading system 10 in accordance with the present invention. Briefly, drive loading system 10 comprises a drive carrier 12 adapted to insert a drive 14 into a chassis 16 in a transverse orientation relative to chassis 16 and move drive 14 in a transverse direction into engagement with a socket 18 disposed on a side-mounted backplane 20 of chassis 16. Chassis 16 may comprise support structure corresponding to or forming part of a server or other type of electronic system or structure. In the embodiment illustrated in FIG. 1, drive carrier 12 is inserted into a front portion 22 of chassis 16 to provide hot swapability of drive 14. As used herein, "front" shall mean a portion of chassis 16 generally accessible by a user to remove and replace, or hot swap, drives 14 relative to chassis 16. For example, in the embodiment illustrated in FIG. 1, front portion 22 of chassis 16 comprises a forwardly-facing portion of chassis 16 such that drive carrier 12 is inserted into a forwardly-facing opening of chassis 16 and is adapted to move or translate drive 14 in a transverse direction relative to the forwardly-facing opening of chassis 16 toward a side-mounted backplane 20 to engage drive 14 with socket 18. However, it should be understood that drive carrier 12 may be used to insert drive 14 into other areas or openings of a chassis and transversely move drive 14 to engage a corresponding socket 18 located within chassis 16. For example, drive carrier 12 may also be used to insert drive 14 into a side-facing opening of chassis 16 and transversely move drive 14 toward a rear-mounted backplane 20 to engage a corresponding socket 18.

As illustrated in FIG. 1, drive carrier 12 is inserted into front portion 22 of chassis 16 in the direction indicated generally by 26. As illustrated in FIG. 1, drive carrier 12 comprises an actuator 24 adapted to be actuated by a user to move drive 14 in a direction different than direction 26, indicated generally at 28, to communicatively couple drive 14 to socket 18. In the embodiment illustrated in FIG. 1, directions 26 and 28 are perpendicular to each other; however, it should be understood that directions 26 and 28 may also be non-perpendicular with respect to each other. As further illustrated in FIG. 1, backplane 20 is vertically disposed within chassis 16 in an orientation perpendicular to direction 28. Additionally, chassis 16 comprises a rearwardly disposed perforated wall 30 and a cooling assembly 32 disposed rearwardly of wall 30. In operation, cooling assembly 32 draws a cooling airflow 34 into chassis 16 via front portion 22 and adjacent drive 14 to dissipate thermal energy generated by drive 14. Airflow 34 is directed through perforated wall 30 and rearwardly by cooling assembly 32.

FIGS. 2A and 2B are diagrams illustrating a top view and a bottom view, respectively, of an embodiment of drive carrier 12 illustrated in FIG. 1. In the embodiment illustrated in FIGS. 2A and 2B, drive carrier 12 comprises a support assembly 38 having support members 40, 42, and 44 for supporting the insertion of drive 14 into chassis 16. Support members 40, 42, and 44 may comprise separate and discrete components coupled together using fasteners or other conventional means. However, support members 40, 42, and 44 may also comprise an integrally formed structure. Drive 14 may be coupled to support assembly 38 using fasteners extending through holes 46 formed in support members 40 and 42 and into a corresponding drive 14. However, drive 14 may be otherwise coupled to support assembly 38 using other means.

As illustrated in FIGS. 2A and 2B, actuator 24 of drive carrier 12 is pivotally coupled to a front portion 50 of drive carrier 12 to accommodate accessibility of actuator 24 by a user. Actuator 24 may be pivotally coupled to support member 42 using a pin 52; however, it should be understood that actuator 24 may be otherwise coupled to drive carrier 12 to provide rotatable movement of actuator 24 relative to drive carrier 12.

As best illustrated in FIG. 2A, a locking element 56 is disposed on support member 42 to engageably cooperate with actuator 24 to secure actuator 24 adjacent to support member 42 after actuation of actuator 24 to engage drive 14 with socket 18 of chassis 16. For example, as illustrated in FIG. 2A, actuator 24 comprises an arm 58 having an opening 60 disposed therein to cooperate with an outwardly extending tab 62 of locking element 56 such that rotation of arm 58 towards support member 42 causes tab 62 to extend through opening 60 in arm 58. Tab 62 is configured having suitable flexibility such that tab 62 slightly deflects upon engagement of opening 60 onto tab 62 so that as tab 62 extends through opening 60, tab 62 returns to a generally undeflected position so that a protruding portion 64 of tab 62 engages a forward surface 66 of arm 58, thereby preventing the withdrawal of tab 62 from within opening 60. Thus, after rotation of arm 58 into a position adjacent support member 42, locking element 56 secures arm 58 and prevents unwanted or unanticipated movement of actuator 24, thereby preventing unwanted or unanticipated movement of drive 14 and drive carrier 12 relative to chassis 16 after engagement of drive 14 with socket 18. It should also be understood that other types of locking systems may be used to secure actuator 24 in a desired position to prevent unwanted or unanticipated movement of drive 14 and/or drive carrier 12 after engagement of drive 14 with socket 18.

As best illustrated in FIG. 2B, drive carrier 12 also comprises a guide 70 disposed along a lower portion of support member 44 to align drive 14 with socket 18. For example, guide 70 is configured having a predetermined length relative to a rearward portion 72 of drive carrier 12 as measured in the direction indicated generally at 74 such that guide 70 cooperates with a portion of chassis 16 to prevent actuation of actuator 24 and corresponding transverse movement of drive 14 and drive carrier 12 until drive 14 is in alignment with socket 18. The function of guide 70 is described further in connection with FIGS. 3 and 5.

Figure 3:
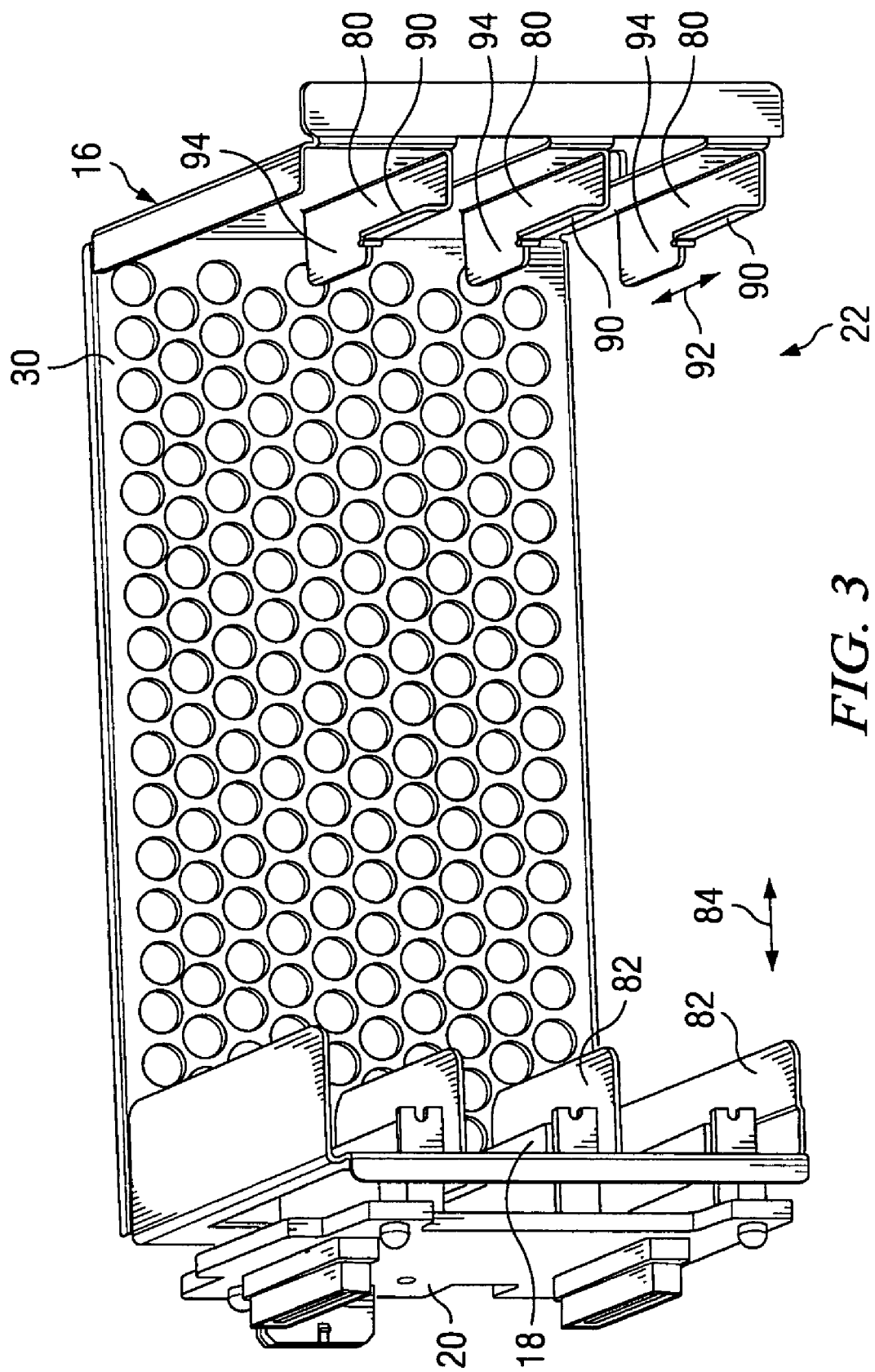
FIG. 3 is a diagram illustrating an embodiment of a chassis illustrated in FIG. 1.

FIG. 3 is a diagram illustrating an embodiment of chassis 16 illustrated in FIG. 1. As illustrated in FIG. 3, chassis 16 comprises guide rails 80 disposed within chassis 16 and support rails 82 disposed opposite from guide rails 80. Support rails 82 are configured having a width as measured in a direction indicated generally at 84 to support drive 14 and drive carrier 12 in both an actuated and un-actuated position of drive carrier 12 relative to chassis 16. For example, as described above, actuation of actuator 24 causes transverse movement of drive carrier 12 and drive 14 to engage drive 14 with socket 18. Thus, support rails 82 are configured having sufficient width to support drive 14 and drive carrier 12 in an engaged and disengaged position relative to socket 18.

In the embodiment illustrated in FIG. 3, each guide rail 80 comprises an upwardly extending flange 90 adapted to cooperate with guide 70 of drive carrier 12 to prevent transverse movement of drive and drive carrier 12 until drive 14 is in alignment with socket 18. For example, in the embodiment illustrated in FIG. 3, flange 90 is configured having a length measured relative to front portion 22 of chassis 16 in a direction indicated generally at 92 such that flange 90 prevents transverse movement of drive 14 and drive carrier 12 relative to chassis 16 until guide 70 moves inwardly within chassis 16 to a position rearwardly of flange 90. Thus, in operation, after guide 70 moves inwardly beyond flange 90, actuator 24 may then be actuated to cause transverse movement of drive 14 and drive carrier 12 to engage drive 14 with socket 18.

As illustrated in FIG. 3, guide rails 80 also comprise an extended lateral portion 94 disposed rearwardly of flange 90 to support drive 14 and drive carrier 12 in an actuated or transversely shifted position. For example, as described above, after drive carrier 12 is inserted into chassis 16 such that guide 70 extends rearwardly of flange 90, actuator 24 may be actuated to cause transverse movement of drive 14 and drive carrier 12. Lateral portion 94 is configured having a width as measured in the direction indicated generally at 84 to support drive 14 and drive carrier 12 in a transversely shifted position. Additionally, in the embodiment illustrated in FIG. 3, chassis 16 comprises three each of guide rails 80 and support rails 82 to accommodate three drives 14 and drive carriers 12; however, it should be understood that a greater or fewer quantity of guide rails 80 and support rails 82 may be disposed within chassis 16 to accommodate a desired quantity of drives 14 and drive carriers 12.

Figure 4A:
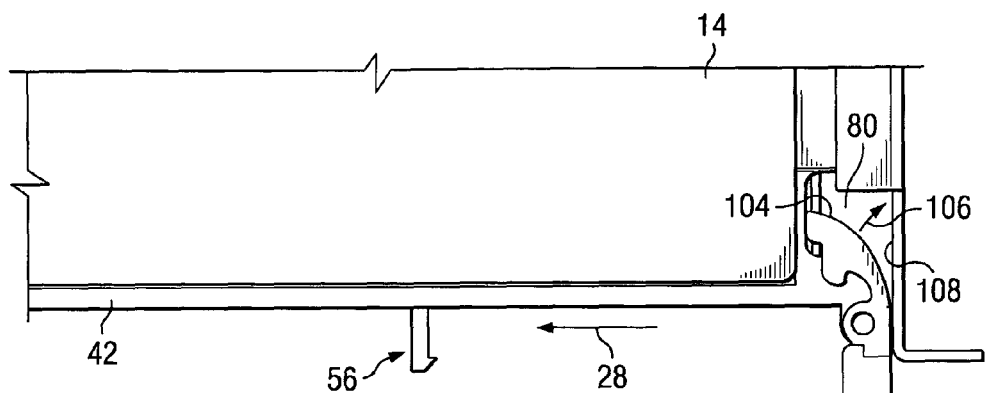
FIGS. 4A and 4B are diagrams illustrating actuation of an embodiment of a drive carrier illustrated in FIG. 1.
Figure 4B:
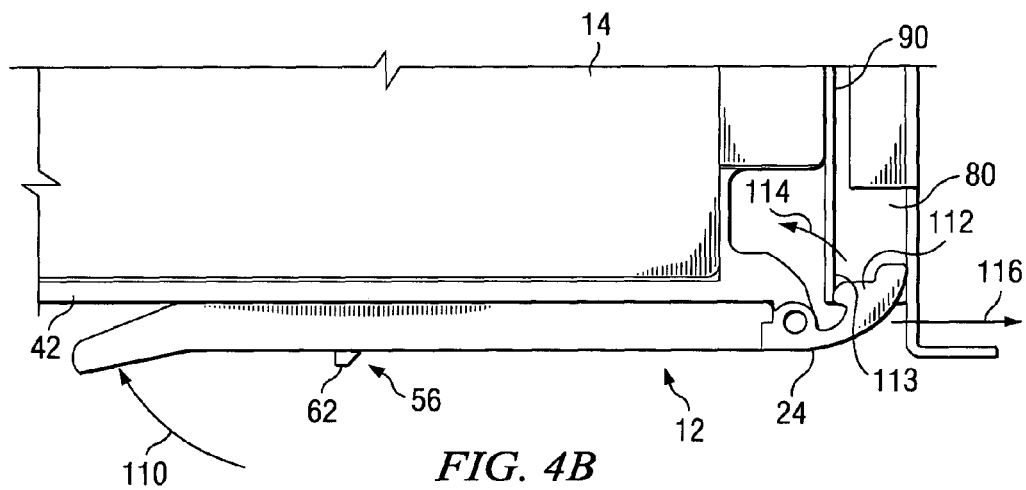

FIGS. 4A and 4B are diagrams illustrating drive carrier 12 in an un-actuated and actuated position, respectively. Referring to FIG. 4A, drive carrier 12 is illustrated as being inserted into chassis 16. In operation, a distal end 100 of arm 58 is rotated inwardly toward support member 42 in the direction indicated generally by 102. As distal end 100 of arm 58 is inwardly rotated in the direction indicated by 102, an opposite end 104 of arm 58 rotates in the direction indicated generally by 106 and into contact with a vertical wall 108 of guide rail 80. As end 104 of arm 58 contacts wall 108, actuator 24 exerts a force in the direction indicated generally by 28 to move drive 14 and drive carrier 12 in the direction indicated by 28, thereby engaging drive 14 with socket 18 of chassis 16.

Referring to FIG. 4B, as arm 58 inwardly rotates towards support member 42, arm 58 engages locking element 56 to lock or secure arm 58 adjacent support member 42 to prevent unwanted transverse movements of drive 14 and drive carrier 12 which may result in an inadvertent disengagement of drive 14 from socket 18. To disengage drive 14 from socket 18, a user may manually deflect tab 62 to disengage arm 58 from locking element 56 and rotate arm 58 in the direction indicated generally at 110. As arm 58 rotates in the direction indicated at 110, a cam portion 112 of arm 58 contacts an interior surface 113 of flange 90, thereby applying a force to flange 90 in the direction indicated generally at 114 and causing movement of drive 14 and drive carrier 12 in a direction opposite 28, indicated generally at 116. Thus, as drive 14 and drive carrier 12 move in the direction indicated at 116, drive 14 becomes disengaged from socket 18, thereby enabling removal of drive 14 and drive carrier 12 from chassis 16.

Figure 5:
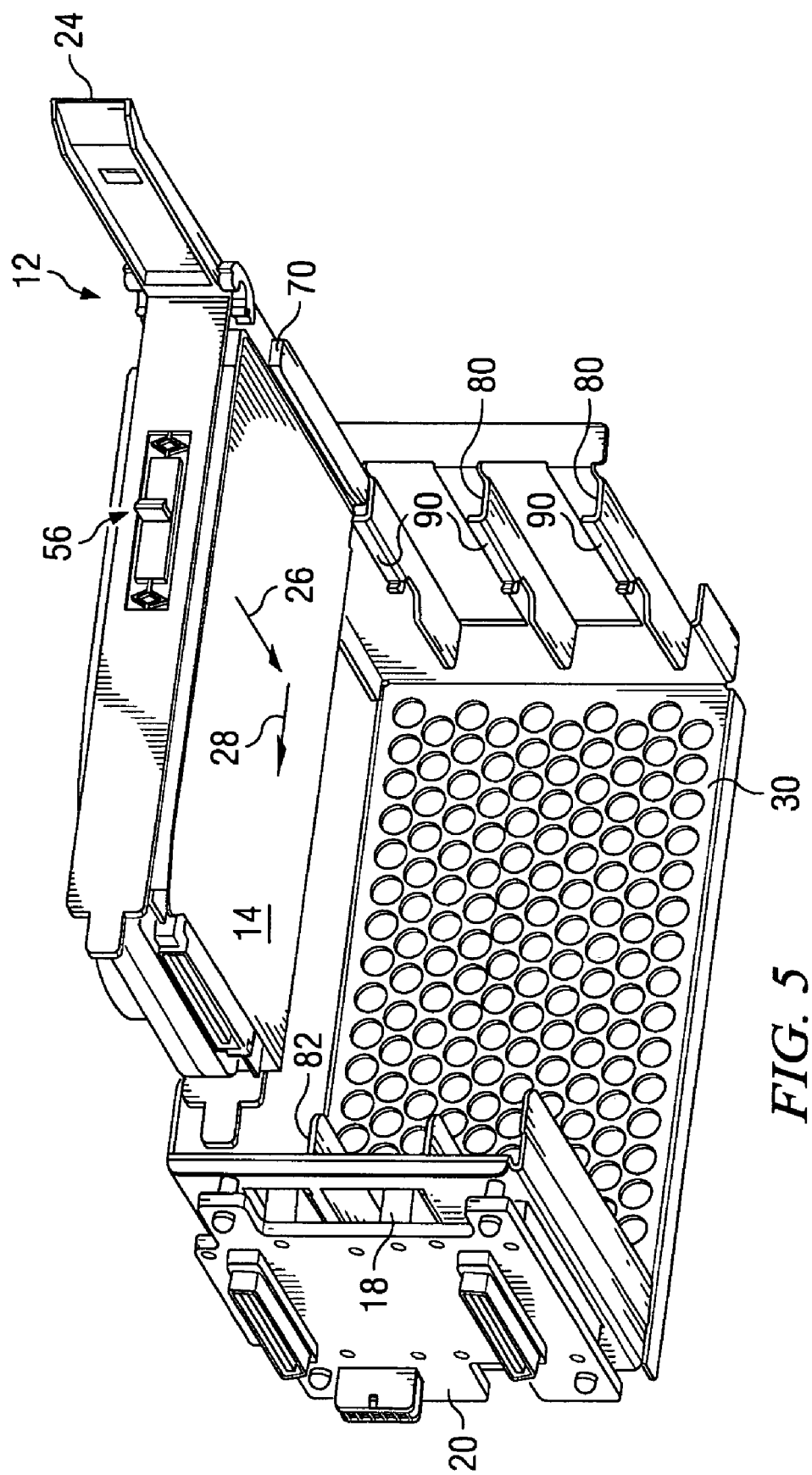
FIG. 5 is a diagram illustrating another view of the drive system illustrated in FIG. 1.

FIG. 5 is a diagram illustrating an upward view of drive loading system 10 illustrated in FIG. 1. As illustrated in FIG. 5, guide 70 of drive carrier 12 cooperates with guide rail 80 to prevent transverse movement of drive 14 and drive carrier 12 until guide 70 is disposed rearwardly of flange 90. As described above, guide 70 and flange 90 are configured having corresponding lengths such that transverse movement of drive 14 and drive carrier 12 is prevented by flange 90 until guide 70 is positioned rearwardly of flange 90, at which time drive 14 is aligned with a corresponding socket 18 of chassis 16. Thus, in operation, guide 70 and flange 90 of guide rail 80 cooperate with each other to prevent actuation of actuator 24 until drive 14 is aligned with a corresponding socket 18. After drive carrier 12 is inserted into chassis 16 to a position to enable actuation of actuator 24, actuator 24 may then be actuated in a manner as described in FIG. 4A to transversely move drive 14 and drive carrier 12 in the direction indicated at 28 to engage drive 14 with socket 18.

Thus, embodiments of the present invention provide for enhanced cooling of chassis 16 while also providing easy hot-swapability of drives 14 from chassis 16. For example, by providing side-mounted backplane 20, rearwardly disposed wall 30 may be configured having additional cooling or airflow passages, thereby enhancing airflow through chassis 16 and enhancing thermal energy dissipation. Thus, less powerful fans may be utilized to dissipate thermal energy, and the fans may be operated at lower speeds to reduce energy consumption. Further, utilizing less powerful fans operating at lower speeds provides acoustic advantages. For example, because of less airflow impedance, the fans may be operated at slower speeds to provide thermal dissipation, thereby providing a less noisy operating environment. Additionally, drive loading system 10 provides for easy interchangeability of drives 14 via a front portion 22 or other area of chassis 16 while also preventing unwanted or unanticipated disengagement of drive 14 from a corresponding socket 18.

What is claimed is:

1. A drive loading system, comprising:
   a chassis adapted to receive at least one drive; and
   a carrier adapted to support insertion of the drive into the chassis in a first direction, the carrier further adapted to move the drive in a second direction transversely relative to the first direction to engage the drive with a socket, the carrier adapted to support insertion of the drive into the chassis in a transverse orientation coplanar with the first and second directions.

2. The system of claim 1, further comprising a guide adapted to align the drive with the socket.

3. The system of claim 1, further comprising a guide adapted to align the drive with the socket before movement of the drive in the second direction.

4. The system of claim 1, wherein the carrier comprises an actuator adapted to move the drive in the second direction.

5. The system of claim 1, wherein the carrier comprises an actuator adapted to disengage the drive from the socket.

6. The system of claim 1, wherein the carrier comprises an actuator adapted to cooperate with the chassis to move the drive in the second direction.

7. The system of claim 1, wherein the first direction is perpendicular to the second direction.

8. The system of claim 1, wherein the carrier is adapted to support the drive in the chassis after engagement of the drive with the socket.

9. The system of claim 1, wherein the chassis comprises a guide rail adapted to restrict movement of the drive in the second direction until alignment of the drive with the socket.

10. The system of claim 1, wherein the carrier comprises an actuator adapted to move the drive in the second direction after insertion of the carrier into the chassis a predetermined distance.

11. A drive loading system, comprising:
    means for receiving a drive in a first direction; and
    means for supporting insertion of the drive into the receiving means in the first direction, the supporting means adapted to move the drive in a second direction transversely relative to the first direction to engage the drive with a socket, the supporting means adapted to support insertion of the drive into the chassis in a transverse orientation coplanar with the first and second directions.

12. The system of claim 11, further comprising means for aligning the drive with the socket.

13. The system of claim 11, further comprising means to restrict movement of the drive in the second direction until insertion of the drive a predetermined distance into the receiving means.

14. The system of claim 11, wherein the supporting means comprises means for disengaging the drive from the socket.

* * * * *